May 30, 1939.  G. H. B. WEST  2,160,772
SPECIFIC GRAVITY INDICATOR
Filed Feb. 2, 1938
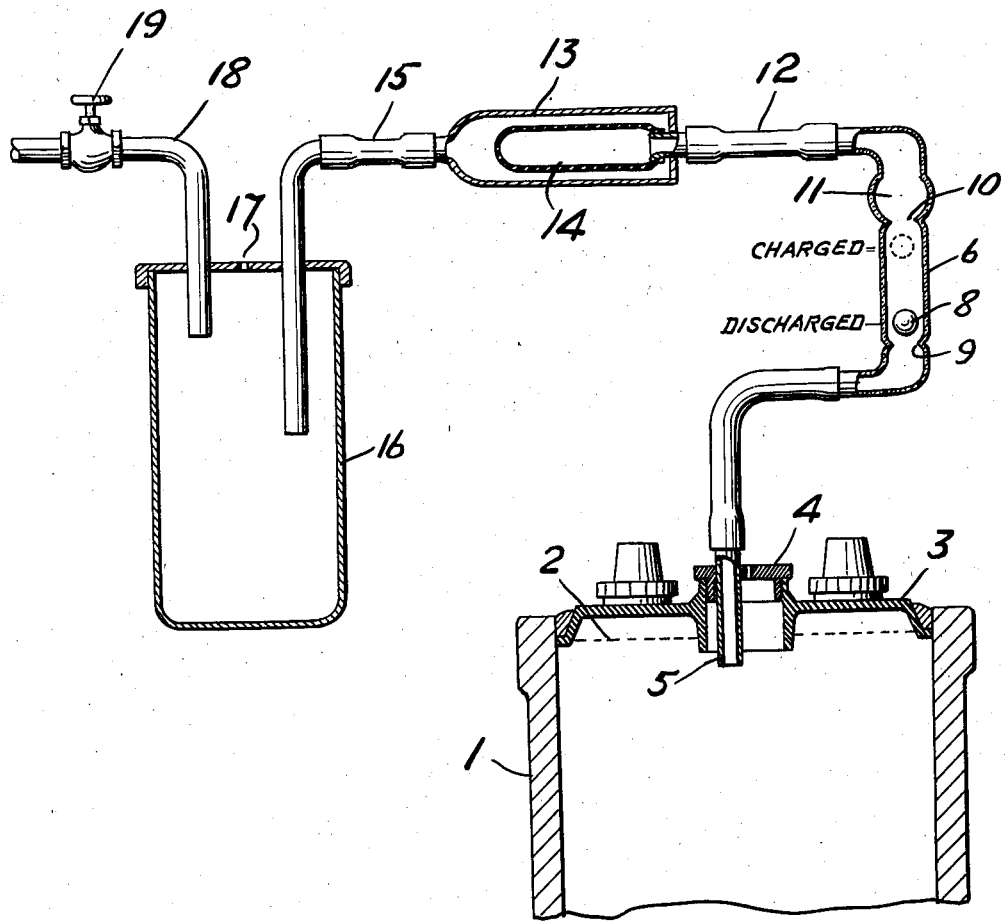
WITNESS:
Robt P Mitchel.
INVENTOR
George H. B. West
BY
Augustus B. Stoughton
ATTORNEY.

Patented May 30, 1939

2,160,772

UNITED STATES PATENT OFFICE 2,160,772

SPECIFIC GRAVITY INDICATOR

George H. B. West, Philadelphia, Pa., assignor to The Electric Storage Battery Company, Philadelphia, Pa., a corporation of New Jersey Application February 2, 1938, Serial No. 188,302

6 Claims. (Cl. 265—45)

An object of my invention is to provide a device intended to give an indication of the specific gravity of the electrolyte in a cell of a storage battery on a vehicle such as an automobile by means of an indicator on the dash. The device consists of a transparent tube containing an indicator ball of a specific gravity intermediate between the maximum and minimum specific gravity of the electrolyte in the cell, the tube being mounted on the dash so as to be visible to the operator and connected below by a suitable duct dipping into the electrolyte of the cell and from above by another duct to which suction is applied by the partial vacuum in the intake manifold of the engine to draw electrolyte from the cell into the indicating tube.

For a further exposition of my invention, reference may be had to the annexed drawing and specification, at the end thereof my invention will be specifically pointed out and claimed.

The drawing shows a schematic and diagrammatic illustration of my invention.

In that embodiment of my invention selected from among others for illustration in the drawing and description in the specification, my device is seen to be a storage battery having a casing 1 adapted to contain electrolyte, the normal of the level of the electrolyte being shown at 2. Casing 1 is provided with a cell cover 3 having therein a detachable vent plug 4. A duct 5 projects through the cell cover or through the vent plug into the electrolyte to a point just below the desired minimum level of the electrolyte.

There is mounted on the dash of the automobile or other vehicle in which the device is used a transparent tube 6 connected by a pipe or other means to duct 5. Tube 6 contains an indicator 8 shown in the shape of a ball and having a specific gravity intermediate the maximum and minimum gravities of the electrolyte, so that the ball either floats or sinks in the electrolyte as the specific gravity of the electrolyte changes. The position of indicator 8 in tube 6 thus indicates the specific gravity of the electrolyte and hence the condition of charge of the storage battery. Tube 6 is provided adjacent its ends with stops 9 and 10 which limit the travel of the indicator 8. At its upper end, tube 6 may be provided with an enlarged section 11 forming an acid reservoir.

For the purpose of drawing electrolyte into tube 6, tube 6 is connected at its upper end by pipe 12 with a vacuum chamber 13 which contains an expansible member 14 such as a rubber sack or expansion bellows. This provides a means to prevent an excess of electrolyte from being drawn from the cell since the vacuum chamber 13 is designed to limit the expansion of the expansion means 14 and hence to limit the amount of electrolyte which can be drawn from the battery cell.

Vacuum chamber 13 is provided with a suitable duct 15 leading into an over-flow reservoir 16, which is tightly sealed except for a pin hole vent 17. From reservoir 16 a duct 18 extends to the intake manifold of an internal combustion engine, there being provided a control valve 19 in duct 18.

The operation of my device is as follows:

When the apparatus is not in use, the control valve is closed and the pressure in the over-flow reservoir is restored to normal atmospheric pressure by the pin hole vent. There will therefore be no vacuum applied to the rubber sack which will be deflated and there will be no liquid in the indicator tube. The slight gassing which occurs in every storage battery cell will release bubbles of gas, some of which will ascend into the indicator tube, displacing any liquid which may have remained in it.

When the operator wants to get a reading indicating the condition of the cell, he will open the vacuum control valve which will apply a partial vacuum to the over-flow reservoir, and this partial vacuum will be communicated to the cylindrical closure or vacuum chamber surrounding the rubber sack. This will cause electrolyte from the storage battery to be drawn up into the indicator tube and the pilot ball will take a position at the top or the bottom of the tube, depending upon the specific gravity of the electrolyte, thus indicating to the operator the condition of the battery. Having obtained this indication, the operator will close the vacuum control valve, whereupon atmospheric pressure will be restored to the over-flow reservoir and vacuum chamber and the electrolyte in the indicator tube will flow back into the cell.

The ducts dipping into the electrolyte of the cell should preferably extend to a point just below the minimum desired level of the electrolyte. If the level of the electrolyte falls below this point, this fact will be indicated when the operator opens the vacuum control valve 19 by the fact that no electrolyte will be drawn into the indicator tube 6.

In case the rubber sack 14 should be disrupted at any time or a leak develop in it, electrolyte would escape into the vacuum chamber 13 and into the over-flow reservoir 16.

The latter is preferably so designed that it will hold all of the electrolyte which can be drawn out of the cell 1 until the level in the cell has fallen to a point below the lower end of the duct 5 dipping into the cell so that even in such a contingency no electrolyte can be drawn into the intake manifold of the engine.

I do not intend to be limited save as the scope of the prior art and of the attached claims may require.

I claim:

1. A specific gravity indicator for use with a storage battery and an internal combustion engine comprising, a hollow element connected at one end to the intake manifold of the engine and at the other end to the storage battery below the normal level of the electrolyte therein, said element having a transparent vertically extending portion, an indicator located in said portion and having a specific gravity intermediate the maximum and minimum specific gravities of the electrolyte, and an expansible member located in said element between said transparent portion and said engine and blocking off the passage of fluid through said element.

2. A specific gravity indicator for use with a storage battery and an internal combustion engine comprising, a hollow element connected at one end to the intake manifold of the engine and at the other end to the storage battery below the normal level of the electrolyte therein, said element having a transparent vertically extending portion, an indicator located in said portion and having a specific gravity intermediate the maximum and minimum specific gravities of the electrolyte, an expansible member mounted in said element between said transparent portion and said manifold and blocking the passage of fluid through said element, and a reservoir sealed except for a small vent therein and located in said element between said member and said intake manifold and having sufficient capacity to contain the electrolyte in said battery above the end of said element projecting into said electrolyte.

3. A specific gravity indicator for use with a storage battery and an internal combustion engine comprising, a vacuum chamber of relatively rigid material, a sack of relatively flexible material located in said chamber and normally spaced therefrom except for the support for the sack, a duct connecting the interior of said chamber and the exterior of said sack with the intake manifold of the engine, a second duct connecting the interior of said sack with the interior of the storage battery below the normal level of the electrolyte in the battery, a transparent tube forming a vertically extending portion of said second duct, and an indicator having a specific gravity intermediate the maximum and minimum specific gravities of the electrolyte and located in said transparent tube.

4. A specific gravity indicator for use with a storage battery and an internal combustion engine comprising, a vacuum chamber of relatively rigid material, an expansible member mounted in said chamber and normally spaced from the inner walls of said chamber except for the support for said member, said chamber being adapted to limit the expansion of said member, a duct connecting the interior of said chamber and the exterior of said member with the intake manifold of the engine, a second duct connecting the interior of said member with the interior of the storage battery below the normal level of the electrolyte therein, a transparent tube forming a vertically extending portion of said second duct, and an indicator having a specific gravity intermediate the maximum and minimum specific gravities of the electrolyte and located in said transparent tube.

5. A specific gravity indicator for the storage battery of an automobile comprising, a vacuum chamber adapted for connection with the intake manifold of the automobile, a closed expansible element mounted in the vacuum chamber, a conduit including a pilot ball gauge and connected above with the interior of said expansible element and having its other open end immersed in the electrolyte of the battery, whereby pressure in the battery in excess of the pressure in the chamber forces the electrolyte through the conduit and to the pilot ball gauge and perhaps into the expansible device, and a closed recess interposed in the connection between the vacuum chamber and the intake manifold and adapted to receive electrolyte in the event of failure of the expansible device.

6. A combination according to claim 5 in which said closed recess is provided with a small vent for admitting air when the exhaust manifold is disconnected to equalize the pressure in the system and permit electrolyte to flow back to the battery.

GEORGE H. B. WEST.